US011385974B1

(12) United States Patent
Wang

(10) Patent No.: US 11,385,974 B1
(45) Date of Patent: Jul. 12, 2022

(54) UNCORRECTABLE MEMORY ERROR RECOVERY FOR VIRTUAL MACHINE HOSTS

(71) Applicant: Google LLC, Mountain View, CA (US)

(72) Inventor: Jue Wang, Redmond, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/188,415

(22) Filed: Mar. 1, 2021

(51) Int. Cl.
*G06F 11/07* (2006.01)
*G06F 11/14* (2006.01)
*G06F 11/20* (2006.01)

(52) U.S. Cl.
CPC ...... *G06F 11/1484* (2013.01); *G06F 11/0772* (2013.01); *G06F 11/0793* (2013.01); *G06F 11/203* (2013.01)

(58) Field of Classification Search
CPC ............. G06F 11/1484; G06F 11/0772; G06F 11/203; G06F 11/0793
See application file for complete search history.

(56) References Cited

U.S. PATENT DOCUMENTS

| | | | | |
|---|---|---|---|---|
| 2009/0144579 | A1* | 6/2009 | Swanson | G06F 11/0796 714/3 |
| 2012/0054543 | A1* | 3/2012 | Dreier | G06F 11/1666 714/6.23 |
| 2014/0181576 | A1 | 6/2014 | Chahal et al. | |
| 2015/0089280 | A1 | 3/2015 | Sade et al. | |
| 2021/0216394 | A1* | 7/2021 | Gadi | G06F 11/0751 |

FOREIGN PATENT DOCUMENTS

| | | |
|---|---|---|
| CN | 111625387 A | 9/2020 |
| WO | 2014051550 A1 | 4/2014 |
| WO | WO-2014051550 A1 * | 4/2014 ............ G06F 11/073 |

OTHER PUBLICATIONS

"Speculative execution", [online] [retrieved Feb. 4, 2021]. Retrieved from the Internet: <URL:https://en.wikipedia.org/wiki/Speculative_execution>, last edited Jan. 27, 2021, 3 pages.

(Continued)

*Primary Examiner* — Matthew M Kim
*Assistant Examiner* — Kyle Emanuele
(74) *Attorney, Agent, or Firm* — Lerner, David, Littenberg, Krumholz & Mentlik, LLP

(57) ABSTRACT

Methods, systems, and apparatus, including computer-readable storage media for uncorrectable memory recovery. Different sources of uncorrectable memory error are handled to provide for recovery actions by a host kernel of a machine hosting one or more virtual machines. Rather than defaulting to kernel panic behavior, the host kernel can identify the source of uncorrectable error, and cause the host machine and/or the affected virtual machines to take recovery action that is less disruptive than abrupt shutdown from panic. For example, the host kernel can handle uncorrectable memory error caused by kernel accesses to guest memory of a host virtual machine, as well as uncorrectable memory error improperly raised as a result of known defects in host machine hardware. The host kernel can also be configured to detect sources of overflow in exceptions raised by a processor as a result of uncorrectable memory error.

20 Claims, 7 Drawing Sheets

(56) References Cited

OTHER PUBLICATIONS

"Second Level Address Translation", [online] [retrieved Feb. 4, 2021]. Retrieved from the Internet: <URL:https://en.wikipedia.org/wiki/Second_Level_Address_Translation>, last edited Jan. 1, 2021, 5 pages.

"Machine Check Architecture", [online] [retrieved Feb. 4, 2021]. Retrieved from the Internet: <URL:https://en.wikipedia.org/wiki/Machine_Check_Architecture>, last edited Dec. 17, 2020, 1 page.

"The x86 kvm shadow mmu", [online] [retrieved Feb. 4, 2021], Retrieved from the Internet: <URL:https://www.kernel.org/doc/Documentation/virtual/kvm/mmu.txt>, (undated), 7 pages.

"Live Migration", [online] [retrieved Feb. 4, 2021], Retrieved from the Internet: <URL:https://en.wikipedia.org/wiki/Live_migration#Cloud_Platforms_with_live_migration_support>, last edited Decembers, 2020, 4 pages.

"Kernel level exception handling in Linux", Commentary by Joerg Pommnitz <joerg@raleigh.ibm.com>, [online] [retrieved Feb. 4, 2021]. Retrieved from the Internet: <URL:https://www.kernel.org/doc/Documentation/x86/exception-tables.txt>, (undated) 6 pages.

"Memory barrier", [online] [retrieved Feb. 4, 2021], Retrieved from the Internet: <URL:https://en.wikipedia.org/wiki/Memory_barrier>, last edited May 11, 2020, 4 pages.

Intel® 64 and IA-32 Architectures Software Developer's Manual, vol. 3B: System Programming Guide, Part 2 Chapter 15: Machine-Check Architecture, pp. 43-78, Intel Corporation, Sep. 2016.

Kleen. Machine Check Handling on Linux Aug. 1, 2004, pp. 1-7, Retrieved from the Internet: <http://halobates.de/mce.pdf>.

Bugnion et al. Bringing Virtualization to the x86 Architecture with the Original VMware Workstation. Nov. 1, 2012. ACM Transactions on Computer Systems, vol. 30, No. 4, pp. 1-51, DOI: 10.1145/2382553.2382554.

Karger et al. A Retrospective on the VAX VMM Security Kernel. Nov. 11, 1991. IEEE Transactions on Software Engineering, IEEE Service Center, Los Alamitos, CA, US, vol. 17, No. 11, pp. 1147-1165, DOI: 10.1109/32.106971.

International Search Report and Written Opinion for International Application No. PCT/US2021/045841 dated Dec. 3, 2021. 19 pages.

* cited by examiner

UNCORRECTABLE MEMORY ERROR RECOVERY FOR VIRTUAL MACHINE HOSTS

BACKGROUND

Cloud computing has impacted the way in which enterprises manage computing needs. Cloud computing provides reliability, flexibility, scalability, and redundancy in a cost-effective manner, enabling enterprises to manage their information technology needs without traditional capital investment and maintenance considerations for their own hosted hardware. As cloud computing infrastructure grows to meet growing demand, an effect of this shift is that memory errors that occur in the cloud, if not contained and/or recovered from, can negatively impact customer and user experiences, as well as degrade their trust in the infrastructure. For example, an uncorrectable memory error on a host machine can lead to the host shutting down or crashing abruptly, also resulting in abrupt termination of all hosted virtual machines. With memory allocation to different virtual machines rising to the order of multiple terabytes, uncorrectable memory errors can potentially impact thousands of virtual machines or applications, requiring unacceptably long time periods to reestablish service.

BRIEF SUMMARY

Aspects of the disclosed technology can include methods, systems, and apparatus, including computer-readable storage media, for handling uncorrectable memory errors in hardware hosting one or more virtual machines.

An aspect is directed to a method for uncorrectable memory error recovery. The method includes receiving, at a kernel for an operating system of a host machine, a machine-check exception indicating an uncorrectable memory error; determining, by the kernel, that the machine-check exception was raised as a result of performing a flagged operation to access a first memory location in guest memory associated with a virtual machine hosted on the host machine, wherein the flagged operation is one of one or more predetermined flagged operations; and in response to the determining, performing one or more recovery actions.

Another aspect is directed to a system including a host machine including one or more processors and one or more non-transitory computer-readable storage media storing instructions, which when executed by the one or more processors, causes the one or more processors to perform operations including: receiving, at a kernel for an operating system of the host machine, a machine-check exception indicating an uncorrectable memory error during execution of one or more operations to access guest memory for a virtual machine hosted on the host machine; determining, by the kernel, that the machine-check exception was raised as a result of performing a flagged operation to access a first memory location in guest memory associated with a virtual machine hosted on the host machine, wherein the flagged operation is one of one or more predetermined flagged operations, wherein the flagged operation is one of one or more predetermined flagged operations; and in response to the determining, performing one or more recovery actions.

Another aspect is directed to one or more non-transitory computer-readable storage media including instructions that when performed by one or more processors, causes the one or more processors to perform operations including receiving, at a kernel for an operating system of a host machine including the one or more processors, a machine-check exception indicating an uncorrectable memory error during execution of one or more operations to access guest memory for a virtual machine hosted on the host machine; determining, by the kernel, that the machine-check exception was raised as a result of performing a flagged operation to access a first memory location in guest memory associated with a virtual machine hosted on the host machine, wherein the flagged operation is one of one or more predetermined flagged operations; and in response to the determining, performing one or more recovery actions.

In some instances, the one or more flagged operations are part of one or more routines having one or more instructions that the host machine is configured to execute as part of performing kernel operations for accessing the guest memory.

In some instances, the method or operations can include identifying the one or more flagged operations, including identifying, from a set of possible routines executable by the kernel, routines including instructions, which, when executed, cause the kernel to access guest memory associated with the virtual machine.

In some instances, performing the one or more recovery actions includes sending a signal, by the kernel, to a virtual machine monitor configured to receive the signal and to send an emulated machine-check exception to the virtual machine, the signal including information from the machine-check exception and indicating that the machine-check exception was raised as a result of executing a flagged operation.

In some instances, the machine-check exception is received from a processor of a host machine, and the one or more flagged operations are operations which, when executed by the processor, cause the processor to generate a machine-check exception with a pointer in memory that does not point to memory accessed by the processor at the time the machine-check exception was raised.

In some instances, performing the one or more recovery actions can include disabling the performance of the one or more flagged operations on a core of the processor; and causing the core to perform the last operation of the one or more operations performed before the machine-check exception was received.

In some instances, the wherein the one or more flagged operations correspond to a processor feature, and wherein disabling execution of the one or more flagged operations includes disabling the processor feature on the core.

In some instances, performing the one or more recovery actions further includes initiating a live migration of the virtual machine to another host machine.

In some instances, the one or more recovery actions can include one or more of: restarting the virtual machine, migrating the virtual machine to another host machine, and causing the virtual machine to replace corrupted data in the guest memory.

Another aspect is directed to a method for uncorrectable memory error recovery in a computing environment, the method including: receiving, at a kernel for an operating system of a host machine, a machine-check exception indicating an uncorrectable memory error during execution of one or more operations; determining, by the kernel, that the machine-check exception was raised as a result of performing a flagged operation of a plurality of flagged operations which, when performed by a processor of the host machines, causes the processor to generate a machine-check exception including a pointer in memory that does not point to memory accessed by the processor at the time the machine-check exception was raised; and in response to the determining, performing one or more recovery actions.

Another aspect is directed to a system including a host machine including one or more processors and one or more non-transitory computer-readable storage media storing instructions, which when executed by the one or more processors, causes the one or more processors to perform operations including: receiving, at a kernel for an operating system of a host machine, a machine-check exception indicating an uncorrectable memory error during execution of one or more operations; determining, by the kernel, that the machine-check exception was raised as a result of performing a flagged operation of a plurality of flagged operations which, when performed by a processor of the host machines, causes the processor to generate a machine-check exception including a pointer in memory that does not point to memory accessed by the processor at the time the machine-check exception was raised; and in response to the determining, performing one or more recovery actions.

Another aspect is directed to one or more non-transitory computer-readable storage media including instructions that when performed by one or more processors, causes the one or more processors to perform operations including: receiving, at a kernel for an operating system of a host machine, a machine-check exception indicating an uncorrectable memory error during execution of one or more operations; determining, by the kernel, that the machine-check exception was raised as a result of performing a flagged operation of a plurality of flagged operations which, when performed by a processor of the host machines, causes the processor to generate a machine-check exception including a pointer in memory that does not point to memory accessed by the processor at the time the machine-check exception was raised; and in response to the determining, performing one or more recovery actions.

In some instances, performing the one or more recovery actions includes: disabling performance of the one or more flagged operations on a core of a processor that sent the machine-check exception; and causing the core to re-perform the last operation of the one or more operations performed before the machine-check exception was received.

In some instances, the one or more flagged operations correspond to a processor feature, and wherein disabling performance of the one or more flagged operations includes disabling the processor feature on the core.

In some instances, performing the one or more recovery actions further includes initiating a live migration of the virtual machine to another host machine.

In some instances, the one or more recovery actions include one or more of: restarting the virtual machine, migrating the virtual machine to another host machine, and causing the virtual machine to replace corrupted data in the guest memory.

Another aspect is directed to a method for uncorrectable memory error recovery, including: initiating, by a host machine hosting one or more virtual machines, execution of a plurality of instructions on a processor of the host machine configured to execute the plurality of instructions with one or more processor features enabled; identifying, by the host machine, an enabled processor feature for the processor that has been predetermined to cause machine-check exception overflow in the processor; and applying a memory fence to one or more instructions of the plurality of instructions that cause the host machine to access guest memory of the one or more virtual machines, wherein the memory fence prevents the host machine from executing the enabled processor feature between the one or more instructions in the memory fence and instructions of the plurality of operations that are not in the memory fence.

Another aspect is directed to a system a host machine including one or more processors and one or more non-transitory computer-readable storage media storing instructions, which when executed by the one or more processors, causes the one or more processors to perform operations including: initiating, by a host machine hosting one or more virtual machines, execution of a plurality of instructions on a processor of the host machine configured to execute the plurality of instructions with one or more processor features enabled; identifying, by the host machine, an enabled processor feature for the processor that has been predetermined to cause machine-check exception overflow in the processor; and applying a memory fence to one or more instructions of the plurality of instructions that cause the host machine to access guest memory of the one or more virtual machines, wherein the memory fence prevents the host machine from executing the enabled processor feature between the one or more instructions in the memory fence and instructions of the plurality of operations that are not in the memory fence.

Another aspect is directed to one or more non-transitory computer-readable storage media including instructions that when performed by one or more processors, causes the one or more processors to perform operations including: initiating, by a host machine hosting one or more virtual machines, execution of a plurality of instructions on a processor of the host machine configured to execute the plurality of instructions with one or more processor features enabled; identifying, by the host machine, an enabled processor feature for the processor that has been predetermined to cause machine-check exception overflow in the processor; and applying a memory fence to one or more instructions of the plurality of instructions that cause the host machine to access guest memory of the one or more virtual machines, wherein the memory fence prevents the host machine from executing the enabled processor feature between the one or more instructions in the memory fence and instructions of the plurality of operations that are not in the memory fence.

In some instances the host machine includes a virtual machine monitor configured to monitor the one or more virtual machines, and wherein the plurality of instructions when executed causes the virtual machine monitor to perform a scan of the guest memory for one or more virtual machines during a live migration of the one or more virtual machines.

In some instances, the identified processor feature is speculative execution.

In some instances, the memory fence imposes an ordering constraint on the order in which the processor executes the operations.

In some instances, applying the memory fence includes adding a plurality of memory fence instructions to the plurality of instructions indicating the start and end of the one or more instructions.

In some instances, the total memory accessed by executing the one or more instructions in the memory fence does not exceed a predetermined memory fence limit.

In some instances, the memory fence limit is 128 bytes.

DETAILED DESCRIPTION

Overview

Figure 1:
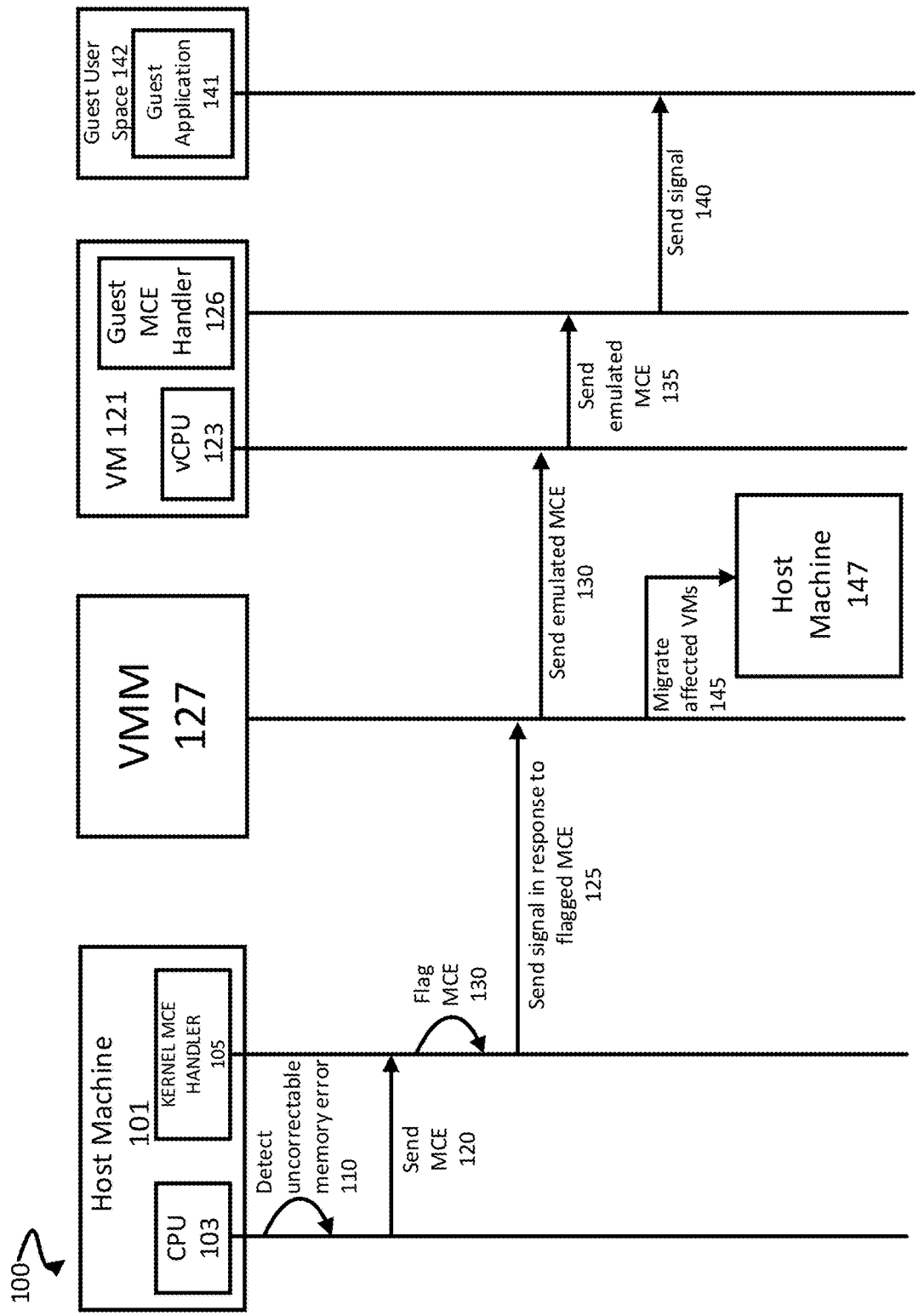
FIG. 1 is a flow diagram of an example process for recovering from MCEs generated from kernel access of guest memory, according to aspects of the disclosure.

This technology relates to identifying and recovering from uncorrectable memory errors from hardware on host machines hosting virtual machines.

A host machine is a device with memory and processors configured to host one or more virtual machines. The host machine can implement a host operating system that runs a host kernel. A virtual machine emulates a real computer system and operates based on the computer architecture and functions of the real computer system or a hypothetical computer system, which may include emulating specialized hardware and/or software. An operating system for a virtual machine is its guest operating system ("guest OS") which can include a guest kernel. Memory allocated to the virtual machine is referred to as its guest memory. The guest memory can correspond to portions of underlying physical memory of the host machine running the virtual machine.

During their operating lifetime, some or all of the memory devices on a host machine can fail for a number of reasons, for example through hardware defects or a result of degradation over time or repeated use. Correctable errors typically do not affect normal operation of a host machine. Uncorrectable memory errors can be fatal to a host machine. For example, an uncorrectable memory error may occur in a memory device when bits of data stored are inadvertently flipped from one binary state to another. This can occur, for example, because of manufacturing defects for the memory device, and/or because of magnetic or electrical interference which can cause bits to flip randomly. Although a host machine can implement error monitoring and handling technology to recover from relatively minor errors, recovery is not always possible.

Left unchecked, an uncorrectable memory error can cause the host machine to crash or shut down with little warning or clue as to the source of the device's failure. The impact of these uncorrectable memory errors can be particularly significant on host machines hosting virtual machines, and especially when each virtual machine may be allocated with gigabytes or terabytes of guest memory.

Some processors for a host machine can be implemented with a machine-check architecture, providing a mechanism for detecting and reporting errors caused by processors or hardware connected to the processors. A machine-check architecture generally refers to portions of a processor configured for identifying and raising machine-check exceptions (MCEs) which a host kernel can receive and interpret. Although a host kernel, such as a kernel based on the Linux kernel, can be configured to receive and handle MCEs corresponding to some uncorrectable memory errors without defaulting to panic behavior, many uncorrectable memory errors result in a kernel taking default panic behavior when other, less disruptive actions, can be performed, as described herein. When a kernel defaults to panic behavior, the kernel can freeze or become responsive. The kernel may also cause the host machine executing the kernel to restart or abruptly shut down.

One problem in applying non-panic actions in response to uncorrectable memory errors is identifying the sources of errors where non-panic actions are possible. Aspects of the disclosed technology include techniques for handling uncorrectable memory errors that would otherwise result in kernel panic. A host kernel configured according to aspects of the disclosure can identify certain scenarios in which the host machine's default panic behavior can be modified to other recovery actions that mitigate overall loss of service or performance degradation for hosted virtual machines.

A host kernel configured as described herein can modify existing panic behavior for kernel access to guest memory. In some examples, the host kernel can be additionally or alternatively configured to modify the default behavior of the host machine in response to machine-check exceptions raised with a pointer to the wrong location in memory of the uncorrectable memory error. Exceptions of this kind may occur, for example, due to identified bugs or defects in processors implemented on the host machine. The host kernel can be additionally or alternatively configured to identify the execution of certain processor-enabled features known to cause overflow in processor registers that are part of the processor's machine-check architecture, and apply memory boundaries as described herein to mitigate or eliminate the risk of overflow.

In response to identifying MCEs raised as a result of the operations described herein, the host machine, through its host kernel, virtual machine monitor, and/or hosted virtual machines, can take one or more of a number of recovery actions as alternatives to default kernel panic. These recovery actions as described herein can include live migration of virtual machines to a healthy host, localizing and containing corrupted memory by an affected virtual machine, and/or selectively disabling offending processor-enabled features.

Aspects of the disclosure described herein can provide for more effective handling of uncorrectable memory errors on a host machine, at least because different sources for common error can be identified and handled by the host machine in a way that does not default to kernel panic. By reducing the instances of kernel panic as described herein, host machines can host virtual machines with fewer service interruptions, and/or with occasional service degradation that is less impactful on overall performance over degradation caused by panic. Further, aspects of the disclosure also provide for techniques for balancing the performance benefits and risk of uncorrectable error caused by a processor-enabled feature. In this way, the risk of uncorrectable error can be tuned and managed to allow for execution of the processor-enabled feature, over other approaches that assume the risk of uncorrectable error without mitigation, or disable the feature entirely.

In addition, the reduction in kernel panic by identifying errors that can be recovered in other ways can be leveraged as a failover mechanism as an alternative to hosting redundant replica virtual machines. For example, the need for replica virtual machines in anticipation of interrupted service from kernel-panicked host machines shutting down abruptly can be reduced by reducing the chance of kernel panic from uncorrectable memory error in the first place, according to aspects of the disclosure. This reduced need for replicas can free up computing resources that can be allocated for other purposes, such as hosting virtual machines for running different applications and services.

Example Methods

Aspects of the disclosure herein provide for example methods of uncorrectable memory error recovery under different identified scenarios and contexts. The techniques described can generally be implemented together in any combination, including implementation of one or more techniques at the exclusion of others.

Figure 2:
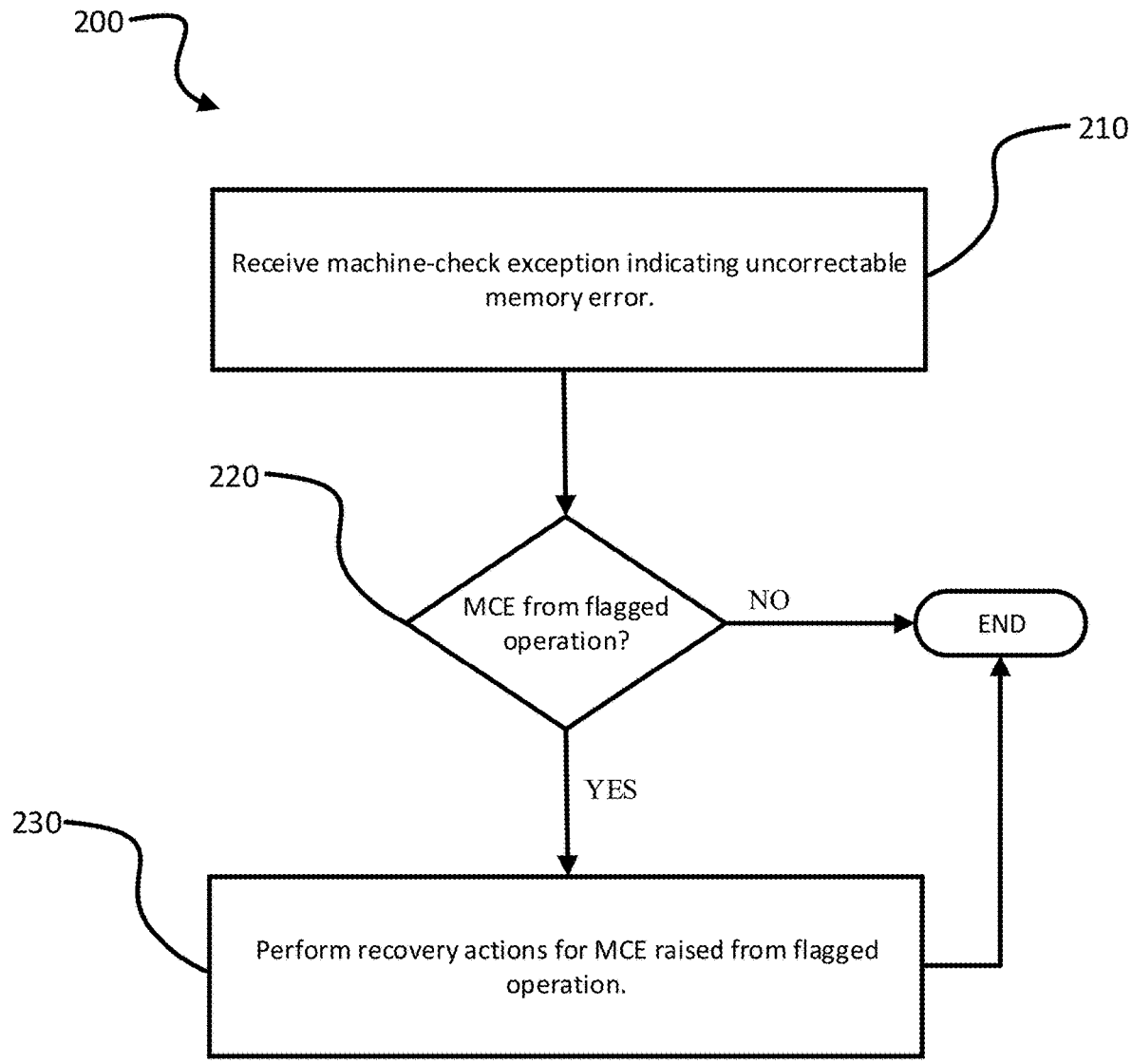
FIG. 2 is a flow diagram of an example process for recovering from uncorrectable memory errors, according to aspects of the disclosure.
Figure 3:
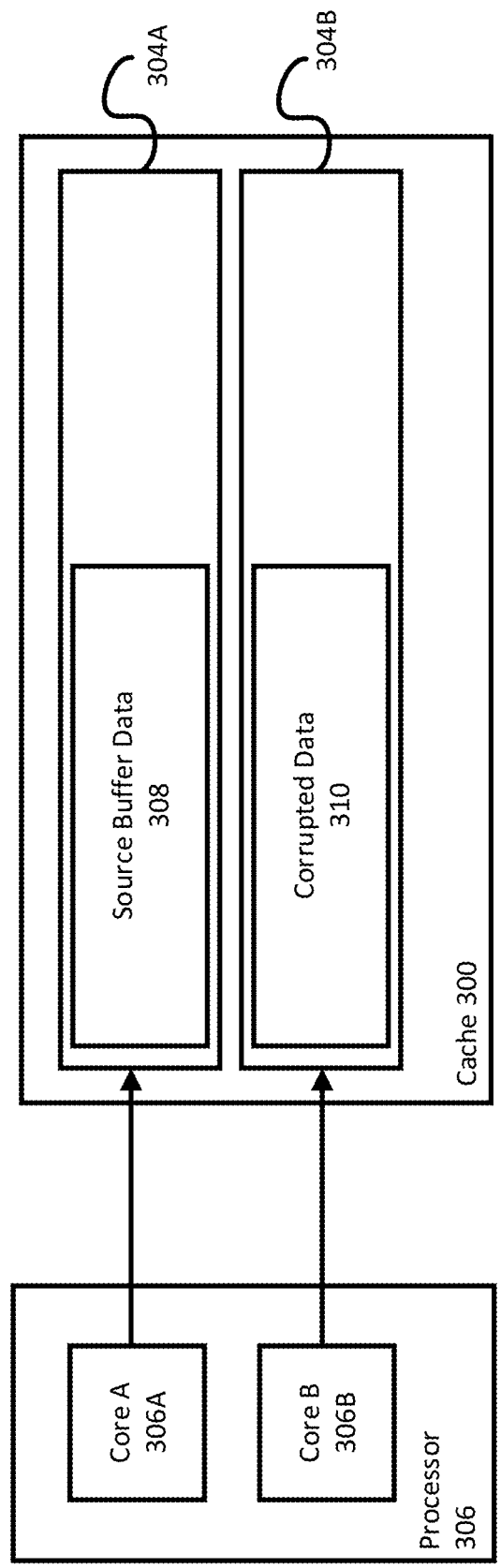
FIG. 3 is a block diagram of cache in which corrupted memory in a cache line is incorrectly raised in a MCE.
Figure 4:
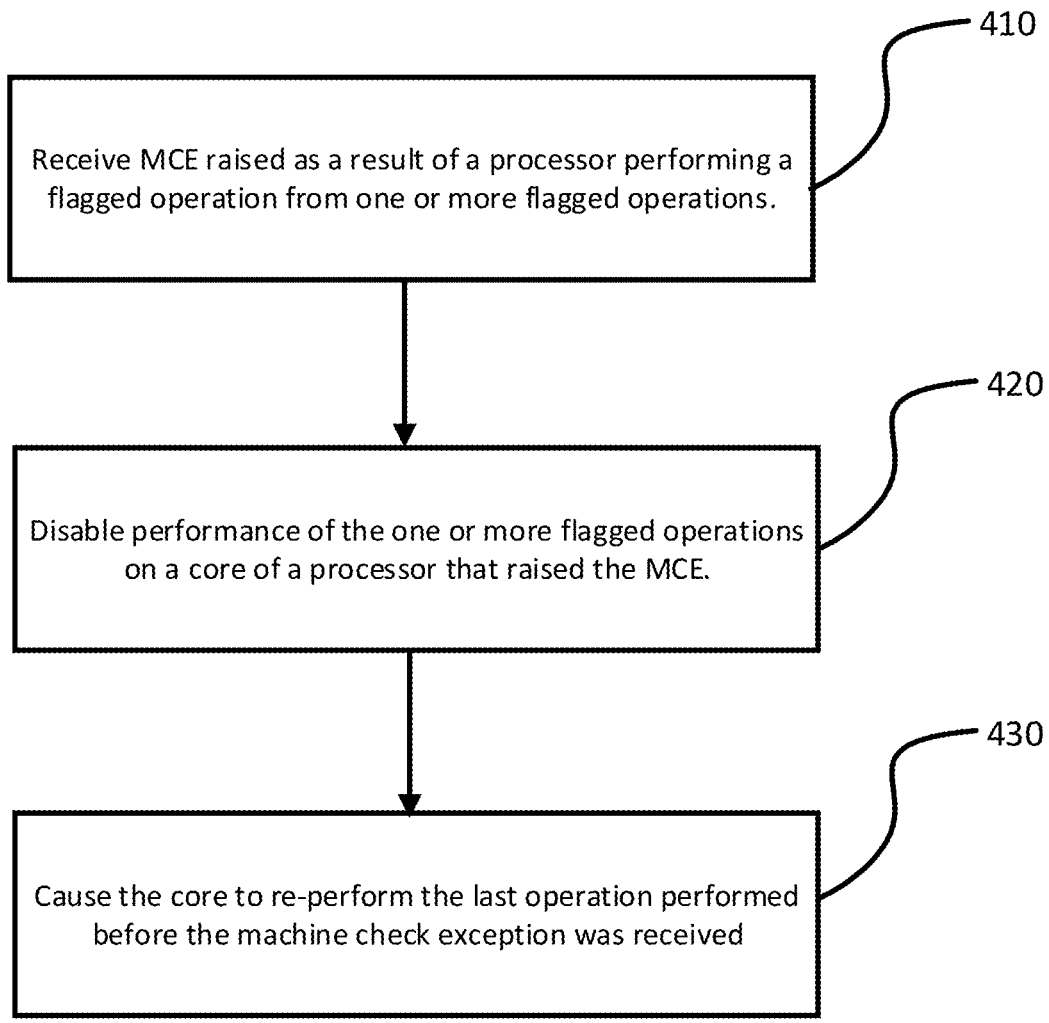
FIG. 4 is a flow diagram of an example process for handling MCEs raised with incorrect pointers to corrupted memory, according to aspects of the disclosure.
Figure 5:
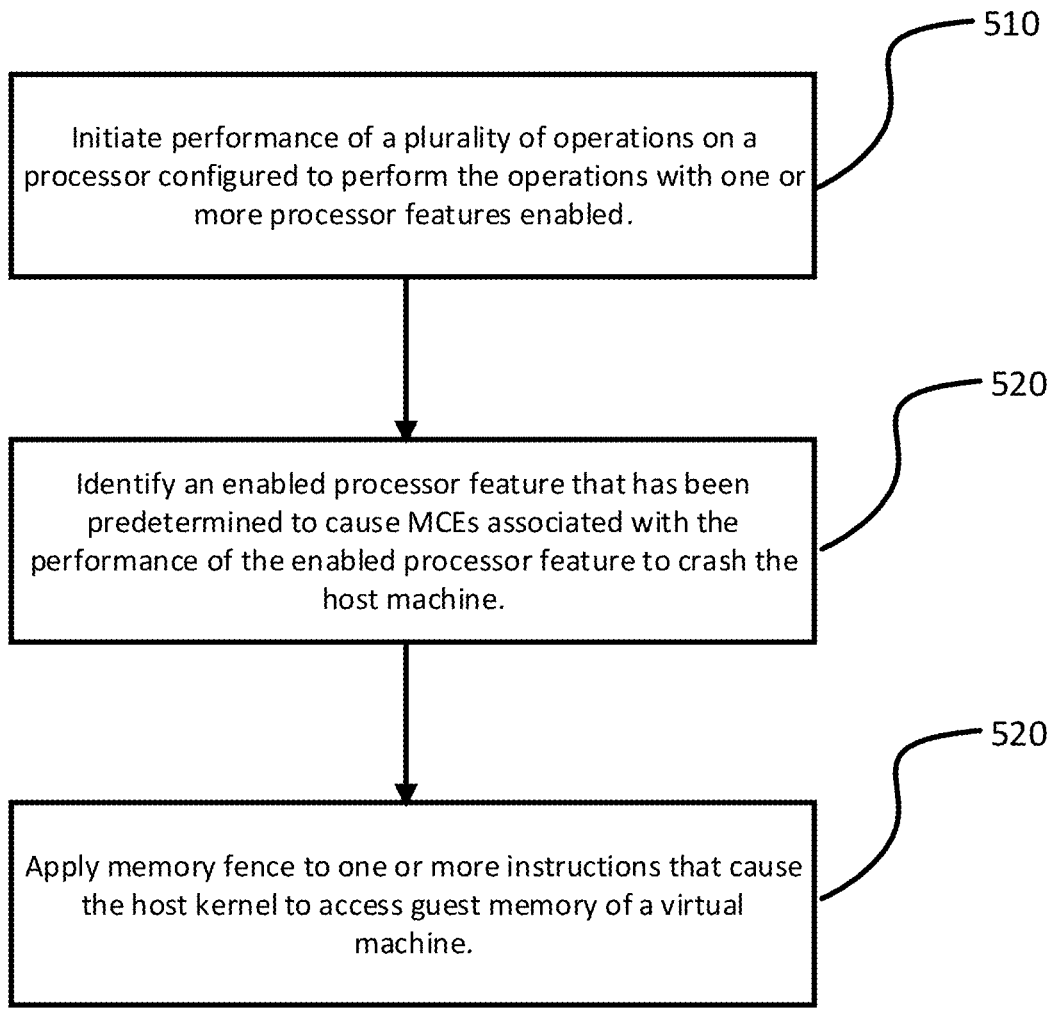
FIG. 5 is a flow diagram of an example process for mitigating the risk of MCE overflow error from an enabled processor feature.

FIGS. 1-2 and their corresponding description relate at least in part to recovery techniques implemented on a host machine to handle MCEs raised when the host kernel accesses guest memory of a virtual machine. FIGS. 3-4 and their corresponding description relate at least in part to recovery techniques implemented on a host machine for handling MCEs raised with incorrect pointers to memory not accessed by executing instructions for performing operations that raised the MCEs. FIG. 5 and its corresponding description relates at least in part to avoiding MCEs altogether in the context of certain processor-enabled features such as speculative execution, which are determined to cause sporadic host machine crashes or abrupt shutdowns due to MCE overflow.

Uncorrectable Error Recovery from Kernel-Context Accesses to Guest Memory

An uncorrectable memory error can occur while a processor of a host machine is accessing memory as part of the execution of one or more instructions. As an example, the instructions can be part of a software routine that the host machine is configured to execute by its host kernel or an application running on the host machine. As part of executing the instructions, the processor accesses memory coupled to the host machine. The memory accessed can be memory reserved for the host machine, or memory allocated to a virtual machine running on the host machine. Memory allocated to a hosted virtual machine by a host machine is referred to as its guest memory.

When the processor accesses memory on the host machine, it can do so while operating in a kernel context or a user context. In the kernel context, the processor executes instructions that are part of routines or software components of a host kernel for the host machine. The kernel may access guest memory for a variety of different reasons, for example as part of a direct reclaim, compaction, or zswap. In general, the kernel may access guest memory as part of performing routines for copying data from guest memory. Uncorrectable memory errors while accessing guest memory in this kernel context may result in default kernel panic behavior in a host kernel, for example as a precautionary measure to avoid catastrophic data corruption and system failure.

Aspects of the disclosure provide for a host kernel of a host machine configured to allow for uncorrectable memory recovery when a host kernel is not otherwise configured to treat kernel accesses of guest memory as recoverable. A host kernel configured as described herein can receive MCEs generated by the machine-check architecture of a processor in response to accesses to guest memory in which corrupted memory or another error is identified.

Processors of a host machine can implement a machine-check architecture that is configured to identify uncorrectable memory errors and raise machine-check exceptions to the kernel of a host machine implementing the processor. The kernel may include a component in software and/or hardware for receiving MCEs from a processor. According to aspects of the disclosure, an MCE handler implemented as part of the host kernel may flag MCEs from uncorrectable memory errors related to kernel accesses to guest memory. The MCE handler can signal a virtual machine monitor configured to monitor and manage virtual machines hosted on the host machine, and the virtual machine monitor can cause one or more of a variety of recovery actions to be taken, instead of kernel panic. These actions can include injecting an emulated MCE to the affected virtual machine configured to handle the error, as well as initiating migration of virtual machines on the host machine to another host machine.

FIG. 1 is a flow diagram of an example process 100 for recovering from MCEs generated from kernel access of guest memory, according to aspects of the disclosure. A host machine 101 is shown in FIG. 1 as including a central processing unit (CPU) 103 and a kernel MCE handler 105. The host machine 101 can include one or more memory devices (not shown) as well as other components, described in more detail herein with reference to FIGS. 6 and 7.

The kernel MCE handler 105 can be part of a kernel implemented by the host machine (not shown). The CPU 103 is configured with a machine-check architecture to raise machine-check exceptions in response to uncorrectable memory errors. In some examples, the host machine implements other types of processors, e.g., graphics processing units (GPUS), field-programmable gate arrays (FPGA), and/or application-specific integrated circuits (ASICs) such as tensor processing units (TPUs) configured to raise MCEs as described herein.

As shown by line 110, the CPU 103 detects an uncorrectable memory error. The CPU 103 generates a machine-check exception and sends the MCE to the kernel MCE handler 105, as shown by line 120. A MCE can refer to an exception raised indicating an uncorrectable memory error identified by the CPU 103. The MCE can be sent with context information specifying characteristics of the memory error that caused the CPU to raise the exception. The context information can include whether the error occurred while the CPU 103 was executing instructions for causing the kernel to access guest memory of a virtual machine, for example virtual machine 121 hosted on the host machine 101. The context information can also include, for example, the location (memory address) of the memory causing the error, the error type, whether the error is recoverable or not, and the status of neighboring locations in memory.

With the context information, the kernel MCE handler 105 can process and flag the MCE, as shown by line 130. As part of flagging the MCE, the kernel MCE handler 105 can receive the MCE, and based on context information in the MCE, the kernel MCE handler 105 can identify the MCE as caused by a flagged operation represented by instructions in a routine related to kernel operations to access guest memory.

As an example, the MCE handler 105 can identify whether the instructions are flagged based on their respective address, as well as a predetermined range of addresses corresponding to instructions related to a kernel access in guest memory. By comparing the address of an offending instruction against a predetermined range, the MCE handler 105 can specifically compare the offending instructions against instructions for kernel routines for accessing guest memory, and skip over other routines that the kernel is able to execute, but that do not relate to access of guest memory.

The kernel MCE handler 105 can be configured to identify the execution of instructions from one or more routines executable by the host kernel and predetermined to relate to access of guest memory. For example, routines for direct reclaim, zswap, and compaction may borrow from a common set of operations for copying data from guest memory. Those operations can be flagged and identified based on a corresponding set of instructions executed by the processor as part of performing those operations. The kernel MCE handler 105 can identify from available context information that the uncorrectable memory error was identified while the CPU 103 was executing instructions as part of those routines. For example, the context information can include an indicator bit, such as a code segment register value. This indicator bit can represent whether the offending instruction executed was part of a kernel routine.

The host kernel MCE handler can send a signal to a virtual machine monitor (VMM) 127, as shown in line 125. The VMM 127 can be configured to create, destroy, monitor, and manage virtual machines hosted on the host machine 101. The VMM 127 can be a combination of software, hardware, and/or firmware, executing in one or more physical locations, including on the host machine 101 itself, as described in more detail with reference to FIGS. 6 and 7, herein. The host kernel MCE handler 105 can send the signal and corresponding information to the VMM 127 through a bus error signal, e.g., SIGBUS.

The signal sent by the kernel MCE handler 105 can include the context information processed by the VMM 127 to identify locations in virtual memory associated with the physical memory that triggered the uncorrectable memory error. The VMM 127 can identify any affected memory pages, as well as which virtual machines hosted by the host machine 101 are affected by the error. The VMM 127 can map the location of the uncorrectable memory error specified by the MCE to virtual memory space associated with the virtual machines hosted by the host machine 101. In doing so, the VMM 127 can determine the virtual memory and memory page associated with the corrupted memory. In some implementations, the VMM 127 performs other functions, such as maintaining a record of MCEs received and from which processors.

As shown in arrow 130, the VMM 127 sends an emulated MCE to virtual CPU (vCPU) 123 for the virtual machine 121. The vCPU 123 is virtual hardware that the VM 121 is configured to interact with as if it were physical hardware. The VM 121 can interact with multiple virtual processors and memory devices, which are intermediary abstractions of underlying physical hardware on the host machine 101. In this example, the VMM 127 determines that the virtual machine 121 is affected by the uncorrectable memory error that caused the CPU 103 to raise the initial MCE. In some examples, the VMM 127 sends emulated MCEs to multiple virtual machines, if it determines that more than one virtual machine is affected by the uncorrectable memory error.

The emulated MCE includes context information for a guest MCE handler 126, similar to the context information provided in the signal sent to the VMM 127, as shown by line 125. The guest MCE handler 126 can be part of a guest operating system (not shown) for the virtual machine 121. The guest MCE handler 126 is configured to receive MCEs from the vCPU 123, similar to how the kernel MCE handler 105 receives MCEs from the CPU 103.

As shown by arrow 135, the vCPU 123 sends the emulated MCE to the guest MCE handler 126. The guest MCE handler 126, based on the MCE received from the vCPU 123, sends a signal to a guest application 141 running in guest user space 142 for the virtual machine 121, as shown by arrow 140. By providing the emulated MCE, the VMM 127 provides the opportunity for the virtual machine 121 through its guest MCE handler 126 to signal applications in the guest user space 142 and perform one of a variety of different recovery actions. These recovery actions would not otherwise be available had the kernel MCE handler 105 not flagged the MCE as described herein, at least because the kernel MCE handler 105 would have otherwise defaulted to panic.

A recovery action can reduce the blast radius of affected virtual machines affected by the uncorrectable memory error. Left unchecked, default panic behavior by the host machine can affect the performance of several virtual machines running on the same host machine, when the memory error itself may be corrupted data corresponding to a single page accessed by just one of the several virtual machines. Without handling kernel accesses in guest memory as described herein, the default action for the host machine could be a complete restart or some other action that needlessly interrupts the execution of virtual machines not affected by the uncorrectable memory error.

The blast radius of affected virtual machines can be reduced by a recovery action to the uncorrectable memory error. For example, the host machine through its operating system can transparently reload a clean page in a disk cache causing the uncorrectable memory error. As another example of a potential recovery action, the virtual machine monitor may trigger a live migration of virtual machines from an affected host to another host machine.

In some cases, such as when the source of the uncorrectable memory error is corrupted heap memory, the host machine can recover by delegating the MCE to a guest MCE handler of a guest operating system for an affected virtual machine. For example, upon receiving a signal with context information specifying information related to the uncorrectable memory error, the guest user space 142 can determine whether to continue running any applications running in the space. Potentially, the guest user space 142 can perform other recovery actions, such as remapping the affected memory. If possible, the guest user space can reconstruct data stored in the affected memory, and map the reconstructed data to a different, uncorrupted location.

As another recovery action, in addition or as an alternative to sending the emulated MCE, the VMM 127 can initiate live migration of the virtual machine 121 affected by the uncorrectable memory error to another host machine 147, as shown by arrow 145. Live migration generally refers to moving the execution of a virtual machine from one host to another host machine, without removing access to applications and/or services running on the virtual machine. Migration of one or more virtual machines can be preferable to abrupt shutdown of a host machine in response to the uncorrectable memory error. This is at least because existing communication between the virtual machine and other virtual machines or physical devices is not interrupted, or is interrupted for a period of time shorter than the time lost from abrupt shutdown and reboot of the virtual machine.

After migration, the defective host machine can be identified for repair and/or replacement, for example to datacenter monitoring software configured to monitor and track the status and health of various machines housed in a datacenter. When the source of the error, e.g., a defective memory device, is identified, the memory device can be replaced and the host machine can be brought back up online for operation.

Another example recovery action can be to shut down or restart the host machine. The virtual machine monitor 127 may take this course of action when the risk of data loss is slight, for example if the virtual machine 121 is executing a stateless service that can be easily restarted without substantial loss in uptime. In this way, the virtual machine monitor 127 can make a decision proportional to the nature of the memory error, rather than defaulting to the shutdown at the exclusion of other, less intrusive, recovery actions.

FIG. 2 is a flow diagram of an example process 200 for recovering from uncorrectable memory errors, according to aspects of the disclosure. A host machine, appropriately configured as described according to aspects of the disclosure, can perform the process 200.

According to block 210, the host machine receives a machine-check exception (MCE). As described herein with reference to FIG. 1, the kernel of the host machine can receive an MCE raised by a processor configured with a machine-check architecture or other mechanism for raising exceptions to uncorrectable memory errors.

According to block 220, the host machine determines whether the MCE was raised as a result of the processor performing one or more flagged operations. The one or more flagged operations can be identified from a set of predetermined flagged operations. These predetermined flagged operations can include operations that are part of routines for kernel operations, such as access of guest memory, as described herein with reference to FIG. 1.

If the host machine determines that the MCE was not raised from a flagged operation performed by the processor ("NO"), then the process 200 ends. For example, the kernel may be configured to perform default recovery actions for the MCE that do not result in kernel panic.

If the host machine determines that the MCE was raised from one or more flagged operations performed by the processor ("YES"), then according to block 230, the host machine can perform recovery actions in response to the MCE from the flagged operation(s). Under this branch, the host machine can perform particular recovery actions as an alternative to default kernel behavior. For example, if the flagged operation(s) relate to kernel access of guest memory as described with reference to FIG. 1, then the host machine avoids default kernel panic in response to the raised MCE by performing other recovery actions instead. Those actions, as described herein with reference to FIG. 1, can include injecting an emulated MCE to the virtual machine(s) affected by the MCE, and/or causing the virtual machine monitor to initiate live migration of the hosted virtual machines off of the host machine.

Handling MCEs with Incorrect Pointers to Corrupted Memory

In some aspects of the technology a virtual machine monitor is configured to take recovery actions for MCEs raised as a result of hardware glitches or bugs incorrectly accessing memory. Hardware, such as processors, can sometimes operate imperfectly. In the context of uncorrectable memory error and recovery, processors executing instructions involving memory accesses may return pointers in memory. These pointers may identify locations to corrupted memory that would ordinarily cause the host machine to raise an MCE.

However, in some cases, the pointer may be to corrupted memory that is not actually being accessed by a processor for a host machine at the time the MCE is raised. As an example, one type of processor may have known errors for returning, as part of an MCE, the wrong cache line address in cache memory shared among multiple processors and/or processor cores. This can occur sporadically and regardless of whether the corrupted memory was in either kernel-reserved memory or in user memory. In some examples, the defect may occur only under certain circumstances, for example when a processor has a feature enabled that is known to cause an MCE to occasionally be raised incorrectly. As another example, the defect may occur when the processor performs certain types of operations, such as operations for copying strings between locations in memory.

FIG. 3 is a block diagram of cache 300 in which corrupted memory 302 in cache line 304B is incorrectly raised in a MCE. The cache 300 can include multiple cache lines, and the amount of data stored per cache line can vary from implementation to implementation. In one example, each cache line can store 64 bytes of data. In this example, the cache 300 can be accessed by multiple cores of a processor. Each core can execute respective processes independent of one another, and the processor implementing the cores can be configured to read and execute instructions as part of each processor, while sharing the cache 300 among each executing core. As an example, consider core A 306A writing data to cache line 304A, while core B 306B also writes data to the cache line 304B.

In this example, the core 306A has written source buffer data 308 to the cache line 304A. The core 306A may write the source buffer data 308 as part of executing an instruction that processor 306 is configured to perform, such as moving data from a source to a destination. As part of moving the data, the core 306A can store the source buffer data 308, and in a subsequent cycle, copy the source buffer data 308 from the cache line 304A to its target destination. The processor 306 can be configured to raise an MCE if, during the execution of the instruction to transfer data to or from the cache line, the processor 306 detects an uncorrectable memory error.

However, in this example, the processor 306 has a defect in which the processor 306 occasionally raises an MCE when data in another cache line (here, the cache line 304B) has corrupted data. Defects of this kind can occur sporadically, and/or occur only with certain types of executed instructions, such as repeated memory copy instructions executed by a processor core.

The defect can also occur in the context of certain features enabled on the processor 306. In general, a processor may be configured for a variety of different features to improve computation under certain conditions. These features can include features for more quickly copying certain types of data, e.g., strings, under specific conditions. Completely disabling the feature can result in missing out on performance improvements of the processor with the feature enabled, particularly when the defect occurs only occasionally.

However the defect arises, the consequence if left unchecked can be that the MCE handler of the host kernel receives a MCE for an error in unrelated memory (e.g., the corrupted data 310 in the cache line 304B), which is not being accessed by the core 306A at the time the MCE is raised.

FIG. 4 is a flow diagram of an example process 400 for handling MCEs raised with incorrect pointers to corrupted memory, according to aspects of the disclosure. A host machine, appropriately configured as described according to aspects of the disclosure, can perform the process 400.

As shown in block 410, a kernel for the host machine can receive an MCE is raised as a result of a processor performing a flagged operation from one or more flagged operations. As described herein with reference to FIG. 2, the host kernel can be configured to identify MCEs raised as a result of flagged operations performed by the processor for a host machine. Among these operations can be operations that are known to cause incorrectly raised MCEs to occur. These types of operations can be part of predetermined routines, such as string copy routines performable by the processor, and/or certain features that cause these spurious MCEs to raise when enabled. The kernel can identify whether these flagged operations are performed by identifying whether a processor executed instructions corresponding to those operations.

If the kernel is configured to implement multiple techniques for error recovery, then the kernel can be configured to disambiguate between different scenarios that caused a host machine processor to raise an MCE. For example, the kernel can be configured to identify whether an MCE was raised as a result of a kernel access to guest memory, and cause the host machine through its virtual machine monitor and/or its hosted virtual machines to perform recovery actions as described herein with reference to FIGS. 1-2. Otherwise, the kernel can determine that a received MCE was raised as a result of the processor performing certain operations that are predetermined to cause defects as described presently with reference to FIGS. 3-4. The kernel can process context information from the received MCE as part of performing this disambiguation.

According to block 420, the host machine disables execution of the one or more flagged operations on the core of the processor that raised the MCE. For example, if the one or more flagged operations correspond to a certain type of processor feature, then the host machine can disable execution of that feature on the core that is currently performing the operations that caused the processor to raise the received MCE.

According to block 430, the host machine can cause the affected core to re-perform the last operation performed before the machine-check exception was raised and received, e.g., by re-executing the last instruction executed by the processor. Either a new machine-check exception will not raise because the offending feature was disabled, or the new machine-check exception will raise, but with a pointer to the correct location of corrupted memory. In either case, the host machine can cause the virtual machine monitor to take a corresponding recovery action, e.g., as described herein with reference to FIGS. 1-2. In particular, the host machine can cause the virtual machine monitor to begin the live migration of virtual machines hosted on the host machine to be migrated to another host machine. The kernel may be configured to cause this to occur automatically whether or not a new MCE is raised, for example because both cases indicate the presence of corrupted memory, which may result in fatal error if not addressed.

In some cases, it may not be possible to disable the flagged operations on the core, because the flagged operations are necessary for re-performing the last operation before the MCE was raised by the processor. In those cases, the kernel can cause the virtual machine monitor to perform live migration immediately, to migrate virtual machines hosted on the host machine off to another healthy host. The affected host machine can then be slated for repair or have affected components replaced.

Mitigating MCE Overflow from Processor-Enabled Features

Processors can include a variety of features that can enhance data processing by the processor under various conditions. In general, enabling these features by a processor such as a CPU can provide for increased performance, for example by executing instructions in fewer cycles or with fewer idle cycles. However, in some cases, a processor-enabled feature may also cause hardware failures or crashes, for example as a result of a bug or defect. As described herein, disabling the feature is not always feasible, for example because the overall performance drop incurred by disabling the feature outweighs the risk of critical failure. For example, the critical failure may occur only infrequently, or only under certain identified circumstances.

In one example, speculative execution is a technique in which a processor can execute some set of instructions preemptively, e.g., before it is known whether that set of instructions actually needs to be performed. For example, speculative execution can be applied to execute all branches of program code. Regardless of which branch is the correct branch for execution in that current context, a processor with speculative execution enabled can take advantage of otherwise idle computing resources to pre-compute either branch ahead of time. In other examples, speculative execution may be implemented to predict the branch that will be executed in a set of instructions, before the processor reaches a stage of execution in which the correct branch is identified.

It has been observed that speculative execution as a processor-enabled feature can, in some architectures, cause the machine-check architecture for a processor to raise spurious machine-check exceptions. These machine-check exceptions can overflow, and in some cases, cause a host machine to crash.

Generally, uncorrectable memory errors by a processor core are recorded and represented in a set of registers designated as part of the machine-check architecture for the core. If a core is configured to record and process only one MCE at a time, certain features, like speculative execution, may cause an uncorrectable error to be recorded but not properly signaled as an MCE. This can be because the core when implementing one of these types of features does not reach a FINISH or RETIRE instruction that triggers the core to raise the MCE for the uncorrectable error. Therefore, the record of the uncorrectable error is not cleared from the designated registers. The next time the core encounters an uncorrectable error, the core will not be able to record the new error to the designated register without causing an overflow as a result of the previously recorded error not being cleared from the registers. Because the core may be configured to handle only one MCE at a time, the overflow of multiple errors can force the entire system to reset as the only viable option.

It has been further observed that these critical errors occur when the processor is performing certain types of operations, such as operations involving accesses to guest memory for a virtual machine. A host kernel can be configured to identify when the processor is operating with a feature enabled and known to cause these types of critical errors. The virtual machine monitor can further identify certain types of operations performed by the processor with the identified feature enabled, and in response, apply a memory fence around only those instructions to prevent the host kernel from executing the fenced-off instructions using the enabled feature. The memory fence can impose an ordering constraint requiring that instructions in the fence are performed in order.

A memory fence is a set of instructions that are inserted into the instructions representing the plurality of operations to be performed by the processor. The kernel of a host machine can insert these instructions during execution of the plurality of instructions.

A memory fence prevents the processor from accessing memory across a fence boundary while executing instructions in the memory fence. TABLE 1, below, shows an example of fenced-off instructions.

TABLE 1

| | |
|---|---|
| 1 | mfence |
| 2 | movdqu (% rsi), % xmm0 |
| 3 | movdqu 16 (% rsi), % xmm1 |
| 4 | movdqu 32 (% rsi), % xmm2 |
| 5 | movdqu 48 (% rsi), % xmm3 |
| 6 | movdqu 80 (% rsi), % xmm5 |
| 7 | movdqu 96 (% rsi), % xmm6 |
| 8 | movdqu 112 (% rsi), % xmm7 |
| 9 | mfence |
| 10 | sub $-128, % rsi |
| 11 | movdqa % xmm0, (% rdi) |
| 12 | movdqa % xmm1, 16 (% rdi) |
| 13 | movdqa % xmm2, 32 (% rdi) |
| 14 | movdqa % xmm3, 48 (% rdi) |
| 15 | movdqa % xmm4, 64 (% rdi) |
| 16 | movdqa % xmm5, 80 (% rdi) |
| 17 | movdqa % xmm6, 96 (% rdi) |
| 18 | movdqa % xmm7, 112 (% rdi) |
| 19 | sub $-128, % rdi |

In TABLE 1, mfence instructions are added at lines 1 and 9, fencing off instructions 2-8 and indicating the start and end positions of the memory fence. Lines 2-8 include movdqu instructions that cause the processor to move data from one location to another. Without the memory fence instructions, a processor with speculative execution enabled could potentially pre-fetch data from executing instructions ahead of the current instruction being executed. For example, without memory fences, the processor with speculative execution enabled could pre-fetch data as a result of executing the instruction at line 11, while the current instruction executed is the move instruction at line 2. With the memory fence, however, if the processor is currently executing the instruction at line 2, it cannot go beyond pre-fetching data by executing instructions that are not in the fenced-off boundary encapsulating lines 2-8.

By applying memory fences as described herein, a host kernel can be configured to restrict the use of processor-enabled features like speculative execution in scenarios in which the risk of MCE overflow is most likely. For example, a common scenario in which an MCE overflow error may arise as a result of speculative execution is while a virtual machine monitor is accessing guest memory of one or more hosted virtual machines as part of a process of live migration. MCE overflow as described herein is more likely to occur in this scenario, than in others, such as kernel accesses to guest memory, or access by the virtual machine to its own guest memory. The chance of overflow is greater than in these aforementioned scenarios at least because more data is being accessed, e.g., as part of a live scan or other routine that sweeps across the guest memory of a virtual machine. In the context of a live migration, the virtual machine monitor has to access most if not all of the guest memory of a virtual machine as part of migrating the data correctly to another host machine.

Therefore, in one example, the host kernel can be configured to apply memory fences only to instructions that access guest memory by a virtual machine monitor as part of a live migration. In this way, the kernel can mitigate the risk of MCE overflow caused by a processor-enabled feature like speculative execution, without disabling the feature altogether. Although live migration is described as an example scenario where the risk of MCE overflow is highest, in general the kernel can be configured to apply a memory fence to any other of the scenarios described herein, if it is determined that the risk of fatal error from overflow outweighs the performance drop by restricting the feature.

The memory fence can be tuned according to different predetermined memory fence limits. For example as shown in TABLE 1, the amount of data accessed from executing the instructions in lines 2-8 total to 128 bytes. 128 bytes can be the memory fence limit for the memory fence applied by the kernel. The memory fence limit can be increased or decreased to adjust the balance between the penalty for imposing the fence versus the reduction of the probability that MCE overflow will occur. For example, the larger the memory fence limit, the higher chance that the processor will raise multiple MCEs during speculative execution and therefore the higher risk of overflow from encountering multiple uncorrectable memory errors. In some examples, the host machine may tolerate larger memory fence limits without noticeable impact in the rate of fatal errors from MCE overflow. In those examples, the memory fence limit may be tuned to a larger limit.

FIG. 5 is a flow diagram of an example process 500 for mitigating the risk of MCE overflow error from an enabled processor feature. A host machine, appropriately configured as described according to aspects of the disclosure, can perform the process 500.

As shown in block 510, the host machine initiates performance of a plurality of operations on a processor. The processor can be one of one or more processors coupled to the host machine, and configured to perform operations with one or more processor features enabled. The plurality of operations can correspond to a plurality of instructions, that when executed by the processor, causes the processor to perform the operations.

As shown in block 520, the host machine can identify that an enabled processor feature has been predetermined to cause MCEs associated with the execution of the enabled feature to crash the host machine. For example, in some contexts, speculative execution can cause a host machine to crash because of the potential for MCE overflow, as described herein. The host machine can be configured to determine which, if any, features are currently enabled on a processor. The identified features that cause fatal errors like host machine crashing can be predetermined, for example from empirical analysis correlating fatal errors with the presence of certain enabled features. In addition or alternatively, the presence of these sources of fatal errors can be manufacturer-reported.

In any case, the host machine can be configured to search for processor enabled features that are known to cause fatal errors if left unchecked. As described herein, in the context of speculative execution, the host machine may only identify the feature as enabled for purposes of applying a memory fence when the plurality of instructions includes instructions for accessing guest memory by a virtual machine monitor for the host machine.

As shown in block 530, the host machine applies a memory fence to one or more instructions of the plurality of instructions that cause the host kernel to access guest memory of a virtual machine. The host machine can apply multiple memory fences to different sets of instructions in the plurality of instructions, for example because the different sets of instructions each correspond to guest memory access by the virtual machine monitor.

Example Systems

Figure 6:
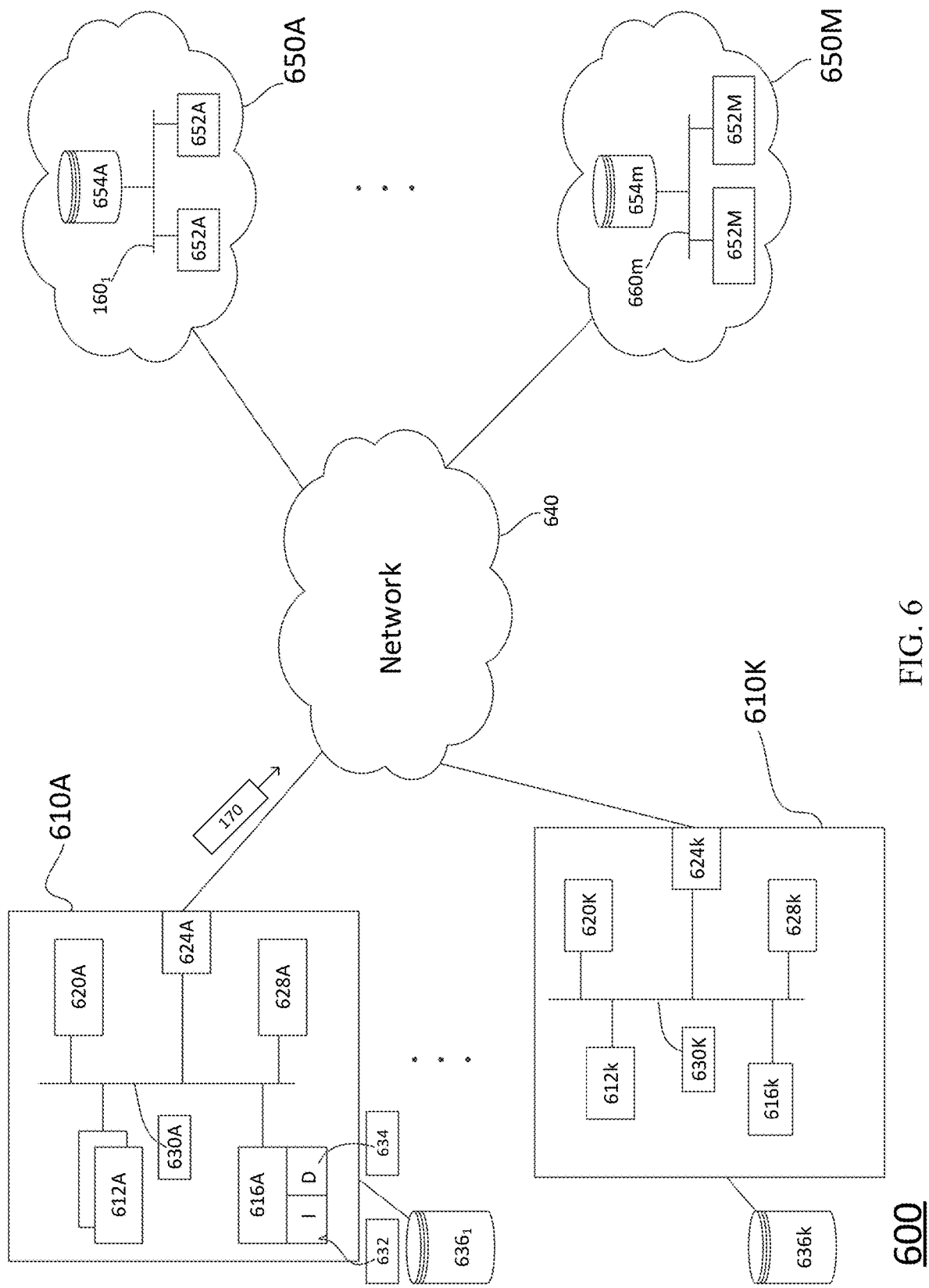
FIG. 6 is a block diagram of an example system, in accordance with aspects of the disclosure.

FIG. 6 is a block diagram of an example system 600, in accordance with aspects of the disclosure. System 600 includes one or more computing devices 610A-K, including devices 610A, K and optionally one or more other devices (not shown). In some implementations, the system 600 includes a single computing device 610A. The system 600 also includes a network 640 and one or more cloud computing systems 650A-M, which can include cloud computing systems 650A and 650M. In some implementations, the system 600 includes a single cloud computing system 650A. Computing devices 610A-K may include computing devices located at customer locations that make use of cloud computing services. For example, if the computing devices 610A-K are located at a business enterprise, computing devices 610A-K may use cloud systems 650A-M as part of one or more services that provide software applications to the computing devices 610A-K.

As shown in FIG. 6, the computer devices 610A-K may respectively include one or more processors 612A-K, memory 616A-K storing data (D) 634A-K and instructions (I) 632A-K, displays 620A-K, communication interfaces 624A-K, and input systems 628A-K, which are shown as interconnected through network 630A-K. Each computing device 610A-K can be coupled or connected to respective storage device 136A-K, which may include local or remote storage, e.g., on a Storage Area Network (SAN), that stores data.

Each computing device 610A-K may include a standalone computer (e.g., desktop or laptop) or a server. The network 630 may include data buses, etc., internal to a computing device, and/or may include one or more of a local area network, virtual private network, wide area network, or other types of networks described below in relation to network 640. Memory 616A-K stores information accessible by the one or more processors 612A-K, including instructions 632A-K and data 634A-K that may be executed or otherwise used by the processor(s) 612A-K. The memory 616A-K may be of any type capable of storing information accessible by a respective processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 632A-K may be any set of instructions to be executed directly (such as machine code) or indirectly (such as scripts) by the processor. One or more instructions executed by the processors can represent an operation performed by the processor. For example, the instructions may be stored as computing device code on the computing device-readable medium. In that regard, the terms "instructions," "routines," and "programs" may be used interchangeably herein, which are executed by the processor to perform corresponding operations. The instructions may be stored in object code format for direct processing by the processor, or in any other computing device language including scripts or collections of independent source code modules that are interpreted on demand or compiled in advance.

The data 634A-K may be retrieved, stored, or modified by processor(s) 612A-K in accordance with the instructions 632A-K. As an example, data 634A-K associated with memory 616A-K may include data used in supporting services for one or more client devices, an application, etc. Such data may include data to support hosting web-based applications, file share services, communication services, gaming, sharing video or audio files, or any other network based services.

Each processor 612A-K may be any of any combination of general-purpose and/or specialized processors. The processors 612A-K are configured to implement a machine-check architecture or other mechanism for identifying memory errors and reporting the memory errors to a host kernel. An example of a general-purpose processor includes a CPU. Alternatively, the one or more processors may be a dedicated device such as a FPGA or ASIC, including a tensor processing unit (TPU). Although FIG. 6 functionally illustrates the processor, memory, and other elements of each computing device 610A-K as being within a single block, it will be understood by those of ordinary skill in the art that the processor, computing device, or memory may actually include multiple processors, computing devices, or memories that may or may not be located or stored within the same physical housing. In one example, one or more of the computing devices 610A-K may include one or more server computing devices having a plurality of computing devices, e.g., a load balanced server farm, that exchange information with different nodes of a network for the purpose of receiving, processing, and transmitting the data to and from other computing devices as part of customer's business operation.

Computing devices 610A-K may include displays 620A-K, e.g., monitors having a screen, a touch-screen, a projector, a television, or other device that is operable to display information. The displays 620A-K can provide a user interface that allows for controlling the computing device 610A-K and accessing user space applications and/or data associated VMs supported in one or more cloud systems 650A-M, e.g., on a host in a cloud system. Such control may include for example using a computing device to cause data to be uploaded through input system 628A-K to cloud systems 650A-M for processing, cause accumulation of data on storage 636A-K, or more generally, manage different aspects of a customer's computing system. In some examples, computing devices 610A-K may also access an API that allows it to specify workloads or jobs that run on VMs in the cloud as part of IaaS (Infrastructure-as-a-System) or SaaS (Service-as-a-System). While input system 628 may be used to upload data, e.g., a USB port, computing devices 610A-K may also include a mouse, keyboard, touchscreen, or microphone that can be used to receive commands and/or data.

The network 640 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, Wi-Fi, HTTP, etc., and various combinations of the foregoing. Such communication may be facilitated by any device capable of transmitting data to and from other computing devices, such as modems and wireless interfaces. Computing devices 610A-K can interface with the network 640 through communication interfaces 624A-K, which may include the hardware, drivers, and software necessary to support a given communications protocol.

Cloud computing systems 650A-M may include one or more data centers that may be linked via high speed communications or computing networks. A data center may include dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent a given cloud computing system includes more than one data center, those data centers may be at different geographic locations within relatively close proximity to each other, chosen to deliver services in a timely and economically efficient manner, as well provide redundancy and maintain high availability. Similarly, different cloud computing systems are typically provided at different geographic locations.

As shown in FIG. 6, computing systems 650A-M may include host machines 152, storage 154, and infrastructure 160. Host machines 652A-M, storage 654A-M. Infrastructure 660A-M can include a data center within a cloud computing system 650A-M. Infrastructure 660A-M may include one or more host machines, as well as switches, physical links (e.g., fiber), and other equipment used to interconnect host machines within a data center with storage 654A-M. Storage 654A-M may include a disk or other storage device that is partitionable to provide physical or virtual storage to virtual machines running on processing devices within a data center. Storage 654A-M may be provided as a SAN within the datacenter hosting the virtual machines supported by storage 654A-M or in a different data center that does not share a physical location with the virtual machines it supports. One or more hosts or other computer systems within a given data center may be configured to act as a supervisory agent or hypervisor in creating and managing virtual machines associated with one or more host machines in a given data center. In general, a host or computer system configured to function as a hypervisor will contain the instructions necessary to, for example, manage the operations that result from providing IaaS, PaaS (Platform-as-a-Service), or SaaS to customers or users as a result of requests for services originating at, for example, computing devices 610A-K.

Figure 7:
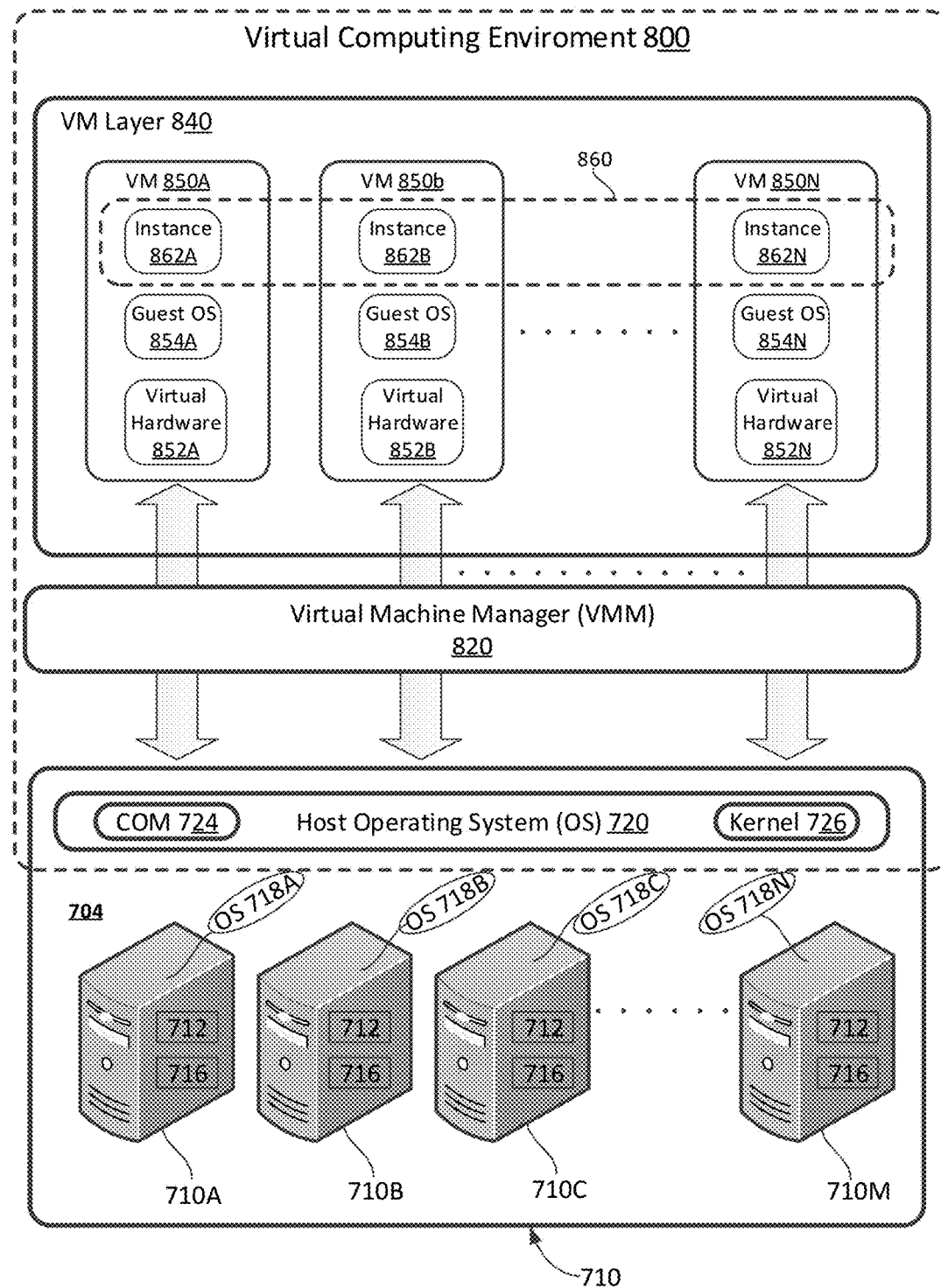
FIG. 7 is a block diagram of an example virtual machine monitor interacting with a host operating system and a virtual machine layer, according to aspects of the disclosure.

FIG. 7 is a block diagram of an example virtual machine monitor 820 interacting with a host operating system 720 and a virtual machine layer 850, according to aspects of the disclosure. A distributed system 700, such as that shown in relation to cloud systems 650A-M of FIG. 6, includes a collection 704 of host machines 710A-M (e.g., hardware resources 710) supporting or executing a virtual computing environment 800. The virtual computing environment 800 includes a virtual machine monitor (VMM) 820 and a virtual machine (VM) layer 840 running one or more virtual machines (VMs) 850A-N configured to execute instances 862A-B of one or more software applications 860. Each host machine 710A-M may include one or more physical central processing units (pCPU) 712 and associated memory devices 716. While each hardware resource or host 710A-M is shown having a single physical processor 712, any hardware resource 710A-M may include multiple physical processors 712 and/or multiple memory devices 716. Host machines 710A-M also include physical memory devices 716, which may be partitioned by host operating system (OS) 720 into virtual memory and assigned for use by VMs 850 in the VM layer 840, or even the VMM 820 or host OS 720. Physical memory devices 716 may comprise random access memory (RAM) and/or disk storage (including storage 654A-M accessible through infrastructure 660A-M as shown in FIG. 6).

Host operating system (OS) 720 may execute on a given one of the host machines 710A-M or may be configured to operate across a collection, including a plurality, of the host machines 710A-M. For convenience, FIG. 7 shows the host OS 720 as operating across the collection of machines 710A-M. Further, while the host OS 720 is illustrated as being part of the virtual computing environment 800, each host machine 710 is equipped with its own OS 718A-M. However, from the perspective of a virtual environment, the OS on each machine appears as and is managed as a collective OS 720 to a VMM 820 and VM layer 840.

In some examples, the VMM 820 corresponds to a hypervisor 820 (e.g., a Compute Engine) that includes at least one of software, firmware, or hardware configured to create, instantiate/deploy, and execute the VMs 850. A computer associated with the VMM 820 that executes the one or more VMs 850A-N is typically referred to as a host machine (as used above), while each VM 850A-N may be referred to as a guest machine. Here, the VMM 820 or hypervisor is configured to provide each VM 850A-N a corresponding guest operating system (OS) 854, e.g., 854A-N, having a virtual operating platform and manages execution of the corresponding guest OS 854 on the VM 850. In some examples, multiple instances of a variety of operating systems may share virtualized resources. For instance, a first VM 850A of the Linux® operating system, a second VM 850B of the Windows® operating system, and a third VM 850C of the OS X® operating system may all run on a single physical x86 machine.

The distributed system 700 enables a user (through one or more computing devices 610A-K) to launch VMs 350A-N on demand, i.e., by sending a command or request 670 (FIG. 6) to the distributed system 700 (including a cloud system 650) through the network 640. For instance, the command/request 670 may include an image or snapshot associated with the host operating system 720 and the distributed system 700 may use the image or snapshot to create a root resource for the corresponding VM. Here, the image or snapshot within the command/request 670 may include a boot loader, the host operating system 720, and a root file system. In response to receiving the command/request 670, the distributed system 700 may instantiate the corresponding VM and automatically start the VM upon instantiation.

A VM emulates a real computer system (e.g., a host machine from host machines 710A-M) and operates based on the computer architecture and functions of the real computer system or a hypothetical computer system, which may involve specialized hardware, software, or a combination thereof. In some examples, the distributed system 700 authorizes and authenticates a user device before launching the one or more VMs 750A-N. An instance 362 of a software application 860, or simply an instance, refers to a VM 850 hosted on the distributed system 700.

The host OS 720 virtualizes underlying host machine hardware and manages concurrent execution of one or more VM instances 850A-N. For instance, host OS 720 may manage VM instances 850A-N and each VM instance 850A-N may include a simulated version of the underlying host machine hardware, or a different computer architecture. The simulated version of the hardware associated with each VM instance is referred to as virtual hardware 352A-N. The virtual hardware 352 may include one or more virtual central processing units (vCPUs) ("virtual processor") emulating one or more physical processors 712 of a host machine 710. The virtual processor may be interchangeably referred to as a "computing resource" associated with the VM instance 850. The computing resource may include a target computing resource level required for executing the corresponding individual service instance 862.

The virtual hardware 852A-N may further include virtual memory in communication with the virtual processor and storing guest instructions (e.g., guest software) executable by the virtual processor for performing operations. For instance, the virtual processor may execute instructions from the virtual memory that cause the virtual processor to execute a corresponding individual service instance 862A-N of the software application 860. Here, the individual service instance 862A-N may be referred to as a guest instance that cannot determine if it is being executed by the virtual hardware 852A-N or the physical data processing hardware 712. A host machine's processor(s) can include processor-level mechanisms to enable virtual hardware 852 to execute software instances 862A-N of applications 860A-N efficiently by allowing guest software instructions to be executed directly on the host machine's processor without requiring code-rewriting, recompilation, or instruction emulation. The virtual memory may be interchangeably referred to as a "memory resource" associated with the VM instances 850A-N. The memory resource may include a target memory resource level required for executing the corresponding individual service instance 862A-N.

The virtual hardware 852A-N may further include at least one virtual storage device that provides runtime capacity for the service on the physical memory hardware 824. The at least one virtual storage device may be referred to as a storage resource associated with the VM instance 850. The storage resource may include a target storage resource level required for executing the corresponding individual service instance 862. The guest software executing on each VM instance 850 may further assign network boundaries (e.g., allocate network addresses) through which respective guest software can communicate with other processes reachable through an internal network 660 (FIG. 6), the external network 640 (FIG. 6), or both. The network boundaries may be referred to as a network resource associated with the VM instance 850.

The guest OS 854 executing on each VM 850A-N includes software that controls the execution of the corresponding individual service instance 862, e.g., one or more of 862A-N of the application 860 by the VM 850. The guest OS executing on a VM instance can be the same or different as the other guest OS 354 executing on the other VM instances 850A-N. In some implementations, a VM instance does not require a guest OS in order to execute the individual service instance 862. The host OS 720 may further include virtual memory reserved for a kernel 726 of the host OS 720. The kernel 726 may include kernel extensions and device drivers, and may perform certain privileged operations that are off limits to processes running in a user process space of the host OS 720. Examples of privileged operations include access to different address spaces, access to special functional processor units in the host machines, such as memory management units, and so on. A communication process 724 running on the host OS 720 may provide a portion of VM network communication functionality and may execute in the user process space or a kernel process space associated with the kernel 726.

As described herein with reference to FIGS. 1-2, the kernel 726 can implement an MCE handler for handling MCEs raised by processors of the host machines 710A-N. Similarly, the guest OS for each VM 850A-N can implement a guest MCE handler for receiving and handling emulated MCEs.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for uncorrectable memory error recovery, comprising: receiving, at a kernel for an operating system of a host machine, a machine-check exception indicating an uncorrectable memory error; determining, by the kernel, that the machine-check exception was received from a processor of the host machine and was raised as a result of performing a flagged operation, wherein the flagged operation is one of one or more predetermined flagged operations, and when executed by the processor, causes the processor to generate the machine-check exception with a pointer in memory that does not point to memory accessed by the processor at a time the machine-check exception was raised; and in response to the determining, performing one or more recovery actions.

2. The method of claim 1,
wherein the one or more predetermined flagged operations are part of one or more routines having one or more instructions that the host machine is configured to execute as part of performing kernel operations for accessing guest memory of a virtual machine hosted on the host machine.

3. The method of claim 2, wherein the method further comprises:
identifying the one or more predetermined flagged operations, comprising identifying, from a set of possible routines executable by the kernel, routines comprising instructions, which, when executed, cause the kernel to access the guest memory associated with the virtual machine.

4. The method of claim 3, wherein performing the one or more recovery actions comprises:
sending a signal, by the kernel, to a virtual machine monitor configured to receive the signal and to send an emulated machine-check exception to the virtual machine, the signal comprising information from the machine-check exception and indicating that the machine-check exception was raised as a result of executing one of the one or more predetermined flagged operations.

5. The method of claim 1, wherein performing the one or more recovery actions comprises: disabling the performance of the one or more predetermined flagged operations on a core of the processor; and causing the core to perform a last operation of the one or more operations performed before the machine-check exception was received.

6. The method of claim 5, wherein the one or more predetermined flagged operations correspond to a processor feature, and wherein disabling execution of the one or more predetermined flagged operations comprises disabling the processor feature on the core.

7. The method of claim 5, wherein performing the one or more recovery actions further comprises initiating a live migration of a virtual machine hosted on the host machine to another host machine.

8. The method of claim 1, wherein the one or more recovery actions comprise one or more of:
restarting a virtual machine hosted on the host machine,
migrating the virtual machine to another host machine, and
causing the virtual machine to replace corrupted data in guest memory of the virtual machine.

9. The method of claim 1, wherein the one or more predetermined flagged operations comprise a flagged operation to access a first memory location in guest memory associated with a virtual machine hosted on the host machine.

10. A system comprising: a host machine comprising one or more processors and one or more non-transitory computer-readable storage media storing instructions, which when executed by the one or more processors, causes the one or more processors to perform operations comprising: receiving, at a kernel for an operating system of the host machine, a machine-check exception indicating an uncorrectable memory error; determining, by the kernel; that the machine-check exception was raised as a result of performing a flagged operation, wherein the flagged operation is one of one or more predetermined flagged operations, and when executed by the one or more processors, causes the one or more processors to generate the machine-check exception with a pointer in memory that does not point to memory accessed by the one or more processors at a time the machine-check exception was raised; and in response to the determining, performing one or more recovery actions.

11. The system of claim 10,
wherein the one or more predetermined flagged operations are part of one or more routines that the host machine is configured to perform as part of performing kernel operations for accessing guest memory of a virtual machine hosted on the host machine.

12. The system of claim 11, wherein the operations further comprise:
identifying the one or more predetermined flagged operations, comprising identifying, from a set of possible routines executable by the kernel, routines comprising operations represented by instructions, which, when executed, cause the kernel to access guest memory associated with a virtual machine hosted on the host machine.

13. The system of claim 12, wherein performing the one or more recovery actions comprises:
sending a signal, by the kernel, to a virtual machine monitor configured to receive the signal and to send an emulated machine-check exception to the virtual machine, the signal comprising information from the machine-check exception and indicating that the machine-check exception was raised as a result of performing one of the one or more predetermined flagged operations.

14. The system of claim 10, wherein performing the one or more recovery actions comprises: disabling performance of the one or more predetermined flagged operations on a core of the processor; and causing the core to perform a last operation of the one or more operations performed before the machine-check exception was received.

15. The system of claim 14, wherein the one or more predetermined flagged operations correspond to a processor feature, and wherein disabling performance of the one or more predetermined flagged operations comprises disabling the processor feature on the core.

16. The system of claim 14,
wherein the host machine is a first host machine, and
wherein the system comprises a second host machine different than the first host machine, and
wherein performing the one or more recovery actions further comprises initiating a live migration of a virtual machine hosted on the host machine to another host machine.

17. The system of claim 10, wherein the one or more recovery actions comprise one or more of:
restarting a virtual machine hosted on the host machine,
migrating the virtual machine to another host machine, and
causing the virtual machine to replace corrupted data in guest memory of the virtual machine.

18. The system of claim 10, wherein the one or more predetermined flagged operations comprise a flagged operation to access a first memory location in guest memory associated with a virtual machine hosted on the host machine.

19. One or more non-transitory computer-readable storage media comprising instructions that when performed by one or more processors, causes the one or more processors to perform operations comprising: receiving, at a kernel for an operating system of a host machine comprising the one or more processors, a machine-check exception indicating an uncorrectable memory error; determining, by the kernel, that the machine-check exception was raised as a result of performing a flagged operation, wherein the flagged operation is one of one or more predetermined flagged operations, and when executed b y the one or more processors, causes the one or more processors to generate the machine-check exception with a pointer in memory that does not point to memory accessed by the one or more processors at a time the machine-check exception was raised; and in response to the determining, performing one or more recovery actions.

20. The non-transitory computer-readable storage media of claim 19,
wherein the one or more predetermined flagged operations are part of one or more routines that the host machine is configured to perform as part of performing kernel operations for accessing guest memory of a virtual machine hosted on the host machine.

* * * * *